United States Patent Office 3,360,581
Patented Dec. 26, 1967

3,360,581
PRETREATING AND ISOMERIZING α-PINENE
John Mentzer Derfer, Jacksonville, Fla., assignor to The Glidden Company, Cleveland, Ohio, a corporation of Ohio
No Drawing. Filed Jan. 16, 1967, Ser. No. 609,352
8 Claims. (Cl. 260—675.5)

ABSTRACT OF THE DISCLOSURE

A process for removing catalyst poisoners from α-pinene stock by contacting it with elemental metallic sodium at a temperature between about room temperature and a higher temperature at which substantial isomerization may first take place, and then isomerizing the pretreated stock with a hydrogen-acceptor catalyst under neutral to basic conditions, at a temperature between about such higher temperature and about 300° C. The isomerization catalyst may also be metallic sodium, present either as an excess during the sweetening step or as a catalytic charge in a separate isomerization zone.

Cross references to related applications

This application is a continuation-in-part of a copending application, "Isomerization of Alpha-Pinene," filed August 12, 1965 and assigned Serial No. 479,275, now Patent No. 3,325,553 the latter being a continuation-in-part application of a prior application, "Alpha-Pinene Isomerization and Product," filed February 19, 1964 and issued on October 11, 1966 as Patent No. 3,278,623.

Background of the invention

Naturally-occurring β-pinene has been isolated from certain α-pinene-rich turpentines, for example, gum and sulfate turpentine from U.S. sources. Beta-pinene is useful as a raw material for producing terpene resins, myrcene and nopol, (6,6 - dimethyl bicyclo (3,1,1) - 2-heptene-2 ethanol) regardless of its optical configuration, and is particularly valuable as a raw material in the synthesis of fine chemicals such as 1-menthol and d-citronellol when such pinene has high optical activity (laevo rotation).

Alpha-pinene is much more abundant than β-pinene, but the alpha isomer has been less valuable as a starting material for chemical syntheses. Alpha-pinene is available from virtually all world turpentine supplies, typically gum, wood and sulfate turpentine in the United States and from many foreign turpentines. Accordingly, there has been interest in converting α-pinene to β-pinene for a number of years, but the prospects for economic, commercial operation heretofore have been slight.

Prior attempts to obtain β-pinene have not been of commercial value because of the high proportions of undesirable by-products which hinder significantly a ready separation of α-pinene from β-pinene and a resulting economic recovery of β-pinene in high purity. The invention described and claimed in the Derfer U.S. Patent 3,278,623 for the first time makes possible the economic recovery of β-pinene from a substantially non-destructive catalytic isomerization of α-pinene. Broadly, the process of this patent comprises establishing vapor or liquid phase contact between an α-pinene supply and a transitory hydrogen-acceptor catalyst under neutral to basic conditions in a reaction zone maintained at a temperature within a range of about room temperature to about 300° C., and withdrawing from the reaction zone a novel isomerizate enriched in β-pinene.

While the process of the cited Derfer patent is, as indicated, the first successful, economic, commercial source of β-pinene by catalytic isomerization, it has been noted that the α-pinene supply tends to poison many catalysts employed, especially a preferred noble metal catalyst, palladium, and is deleterious to catalyst activity. The poisoning of the catalysts is due to the presence of several contaminants in the supply. While the principal offender appears to be chemically combined sulfur, still other ingredients poison the catalysts, such as certain organic chlorides, for example, those introduced by hypochlorite treatment of pinene, although other chlorides such as bornyl chloride and geranyl chloride have not been particularly harmful. As used here and in the claims, "pretreating" the α-pinene supply is intended to include the inhibition of one or all of such offending ingredients in the α-pinene supply from having such undesirable poisoning effect on an isomerization catalyst.

Summary

It has been discovered that elemental metallic sodium, preferably having an extended surface area, is an effective sweetener of sour α-pinene stock prior to its isomerization by a hydrogen-acceptor catalyst. As an instance, after one pass over of sodium of extended surface area, untreated sulfate α-pinene has been found to be a satisfactory feed for subsequent isomerization over a noble metal catalyst.

In the past, sodium has been used to treat hydrocarbon stocks and petroleum distillates. However, such materials have much greater stability toward chemical reagents than the highly reactive turpentine components such as pinene. It would not be obvious that metallic sodium would have the ability to sweeten sour α-pinene without engendering, for example, unwanted side reactions. Further, the sulfur bodies present in petroleum distillates differ greatly in chemical nature from those which may contaminate turpentine.

Moreover, metallic sodium having an extended surface area has especially been found to be effective as an isomerization catalyst for α-pinene. For instance, untreated (but distilled) sulfate α-pinene is a satisfactory feed for a sodium-catalyzed isomerization wherein the sodium has an extended surface area. This would not be true of some noble metal isomerization catalysts which require a purer α-pinene feed. In addition, a lesser amount of by-products is formed over a sodium isomerization catalyst of extended surface than over noble metal catalysts for the same operating conditions.

Inasmuch as the Derfer patent, No. 3,278,623, discloses that an alkali metal is an isomerization catalyst for α-pinene, at first blush it would appear that the present invention is bottomed only on using an isomerization catalyst to prevent poisoning of an isomerization catalyst. However, such a hasty conclusion overlooks several significant results.

As one such result, the use of elemental metallic sodium makes possible a batch operation in which the same alkali metal, sodium, performs both a sweetening operation within one temperature range and then an isomerizing operation within another temperature range. In this form of the invention, the amount of sodium originally used must of course be in excess of that needed to sweeten a sour α-pinene supply.

Another significant result resides in prolonging the useful life of a charge or bed of catalyst (whatever it might be) in an isomerization zone, particularly for a continuous isomerizing process. It is known that "shut-down" periods for equipment designed for isomerization or other catalytic activity are quite costly due to the loss of production time. By having two or more pretreating or "guard" zones, each individually and selectively connected in series only with an isomerizing zone, it is possible to pass successively from one pretreating zone to another as they become exhausted while continuing to use the same isomerization zone. In this manner, the useful life of the isomerization catalyst, guarded against poisoning by the pretreating zone, may continue for a longer period of on-stream time with less frequent interruptions for exchange or replacement of spent isomerization catalyst, all brought about by the defined pre-use of a sweetening agent even though that agent may itself be an isomerization catalyst. The two-bed arrangement provides a much more flexible arrangement and structurally permits a smaller isomerization case in which to house the catalyst.

*Description of the preferred embodiments*

The prime α-pinene supply which may be used is a pure or virtually pure α-pinene. However, the usual commercial grade of α-pinene distillate contains a percent or two of camphene as an indigenous impurity; such grade is economical and quite suitable for my purposes. Additionally, because β-pinene customarily is recovered by fractional distillation of sulfate or gum turpentine, one could use turpentine directly as the α-pinene supply, for example, by feeding it into a distillation unit and obtaining primarily α-pinene as an overhead distillate as the pinene supply for the isomerization reaction, while accumulating a bottoms product of β-pinene, dipentine, oxygenated materials and sesquiterpenes, e.g., anethole, caryophyllene, and methyl cahvicol. The bottoms product could then be fractionated to recover β-pinene and the other high-boiling components. The pinene supply is, for all practical purposes, anhydrous.

As indicated, if many α-pinene supplies are used in an untreated form for the isomerization step, the catalyst life is quite short. In general, an α-pinene supply is considered to require pretreatment if, when contacted by a one percent catalyst of 0.5 percent palladium on alumina for 0.5 hour at atmospheric reflux temperature, there is an increase of β-pinene in the supply of less than 4.5 percent.

The efficiency of the isomerization operation could, therefore, be substantially increased if catalyst poisoning were appreciably reduced or eliminated. Normally, the chief catalyst poisoner found in the α-pinene is sulfur which can be present in several chemically combined forms. However, still other compounds are known to be present in the α-pinene supply which poison the catalyst, such as the certain organic chlorides previously noted.

Referring to the pretreatment technique of the present invention in greater detail, elemental metallic sodium is preferably used in a physical form having an extended surface area. Since sodium in this form can also be used as the isomerization catalyst, the following remarks concerning high surface sodium are applicable to its use as pretreating agent and/or to its use as an isomerization catalyst. In either case, the high surface sodium can be used in conjunction with an inert medium which, in turn, can be either a solid or liquid carrier.

The solid carriers are used for vapor phase treatment of the α-pinene and may comprise such materials as charcoal, alumina, calcium carbonate, sodium carbonate, asbestos, dolomite, thoria, and the like, all of high surface area over which sodium is applied as a film approaching colloidal dimensions. The manner of preparing high surface sodium is known in the art and may be accomplished simply by mixing molten sodium with the suitable inert solid medium. At temperatures above its melting point (97.5° C.), sodium easily spreads over such solids, and the sodium films produced approach atomic dimension in thickness. The effective surface area of the solid inert support determines the amount of sodium adsorbed. Normally, the amount of adsorbed sodium may range from an absolute minimum required to promote pretreatment or a catalytic action to as much as 30 percent by weight of the inert carrier. However, the usual amount is about 10 percent, higher percentages usually resulting in a rather pasty mixture which reduces some of the advantages to be gained from sodium of extended surface area.

When the inert medium is liquid, sodium in the form of fine particles is admixed therewith to form a dispersion. About 0.25 percent to about 1.0 percent of a dispersing aid can be used if desired. Such aids include carbon black, calcium stearate, aluminum laurate, lecithin, zinc stearate, and the like. A number of liquid hydrocarbons performed satisfactorily as media for dispersed sodium particles. The inert medium should not, of course, interfere with the pretreatment or isomerization reaction in any way. The liquid inert medium is usually an aromatic or aliphatic hydrocarbon, such as the following, the temperatures in parentheses being representative boiling ranges in degrees centigrade: toluene (110–111), iso-octane (97–99), light naphtha (103–163), petroleum ether (107–200), n-octane (125–126), xylene (137–140), n-butyl ether (140–144), Stoddard solvent (155–204), mineral spirits (170–195), refined kerosene (182–271), naphthalene (215–22), white oil (287–515), tricresyl phosphate, and the like. It will be noted that preferably the liquid inert medium has a boiling point above the melting point of metallic sodium, 97.5° C.

Sodium dispersions are stable and normally prepared at a temperature slightly above the melting point of sodium, although the dispersions once prepared can be used either above or below the preparation temperature. The fluidity of a sodium dispersion in liquid carriers of the type herein described is usually only slightly less than that of the dispersing medium. A liquid carrier may contain from about 30 percent to about 50 percent by weight of sodium particles which may have a size within the range of one to 20 microns in diameter.

Whether sodium is to be used as a pretreating agent or as an isomerization catalyst, either form previously described (with a solid or liquid carrier) can be used. Similarly, the α-pinene may be treated while it is in either a liquid or vapor phase.

In general, when the α-pinene is in the liquid phase and sodium of extended surface area coating an inert solid carrier is used in the form previously described, the carrier is merely admixed with the liquid α-pinene. It is within the contemplation of the present invention to use sodium particles or comminuted pellets, that is, without an inert solid carrier, although this practice cannot provide the advantages of having sodium in the desired physical form of an extended surface area. In short, fine particles of sodium can be dispersed within the α-pinene supply itself without initially forming either a film of sodium or an inert solid carrier, or a dispersion of sodium in an inert liquid medium, as previously described. It is also intended that a liquid dispersion of sodium (using any of the dispersing vehicles previously disclosed) can be directly admixed, as by stirring, into an α-pinene supply to be pretreated. The inert liquid carrier can subsequently be separated from the treated α-pinene by a fractionation step or series of fractionation steps as will be understood by those skilled in the art.

After admixture of liquid α-pinene with sodium by any of the foregoing techniques, the admixture is maintained at a temperature between about room temperature (70° F. to 80° F.) and a higher temperature at which isomerization may first take place, that is, below which related isomerization and disproportionation products are not formed appreciably. Normally, the temperature of pretreatment ranges from about room temperature to about 160° C. The amount of sodium used and the length of time of pretreatment depend, of course, on the amount of sweetening necessary. This can be established by simple trial and error. As a rule, however, the amount of sodium to be used ranges from about 0.1 percent to about 5.0 percent by weight of the α-pinene supply, and the length of treatment of liquid pinene extends for about 0.1 hour to 8 hours. Thereafter, the treated α-pinene supply may be subjected to the isomerization process to form β-pinene.

When the α-pinene is in the vapor phase and sodium on an inert solid medium is employed, the vapors are passed over or through a bed composed of the solid medium and the sodium supported thereon. Substantially the same amount of sodium should be present per unit volume of liquid α-pinene treated as for that previously stated, but the time of exposure is considerably shortened, for example, to the order of 0.1 to 600 seconds. If a dispersion of sodium is used, the vaporized α-pinene is bubbled through the former, substantially at the concentrations, times and temperatures given for a pretreatment of liquid α-pinene with a dispersion of sodium in a liquid inert carrier.

The use of sodium as a pretreating agent is further unique in that the unused sodium may also act as the isomerization catalyst. Enhanced results are especially obtained when the sodium is in the form of extended surface area. For instance, α-pinene in either vapor or liquid phase can be passed over or through a fixed bed of an inert medium, usually in particulate form, carrying sodium of extended surface area initially under conditions to pretreat or sweeten the α-pinene. The treated α-pinene can subsequently be recirculated over or through the fixed bed at the same or changed conditions as may be needed to effect isomerization of the α-pinene in accordance with the present invention.

Similarly, α-pinene in a vapor phase can be bubbled through a liquid dispersion of sodium, firstly, under conditions effective to pretreat the α-pinene and, secondly, again bubbled through the dispersion under conditions effective to isomerize the α-pinene to β-pinene. Still further, the α-pinene can be admixed with a liquid dispersion of sodium, and the resulting liquid admixture treated under conditions effective to pretreat the α-pinene; and subsequently the same liquid admixture can be treated under conditions conducive to isomerize the α-pinene. In general, all of the foregoing conditions are the same as those previously described in connection with each of such described functions individually. After pretreatment is completed, the α-pinene may be subjected to isomerization as described in the Derfer Patent No. 3,278,623. For the substantially non-destructive isomerization of α-pinene to β-pinene it is essential to maintain the reaction mixture and catalyst (and a catalyst support if one is used) non-acidic in any sense of the word, either where considered as a conventional acid of a conventionally measurable acidity by titration or the like, a Lewis acid, or a material which reacts with a Hammett indicator to give an acid indication. Thus, pure alumina, for example, from aluminum hydroxide or aluminum isopropylate, is a suitable support; whereas silica gel, which reacts as acid to neutral red Hammett indicator, is deleterious as are clays, silica-alumina, and other well-known petroleum cracking catalysts. Thus, the reaction environment should be neutral to basic when measured with neutral red Hammett indicator. Acidic material inherent in or sorbed on the catalyst on the catalyst support is quite detrimental.

The parent patent, No. 3,278,623, describes and illustrates various systems for isomerizing the α-pinene. As there disclosed, the apparatus employed may vary from a sealed steel bomb for the α-pinene supply and catalyst to an atmospheric fractionational distillation process wherein a concentration of the higher boiling β-pinene (as compared to α-pinene) gradually accumulates in collection vessels. The isomerization process can be either continuous or discontinuous, and in either case at superatmospheric, atmospheric, or moderately subatmospheric pressures. The α-pinene supply can also be either in the liquid or vapor phase during isomerization.

As described in Derfer patent, No. 3,278,623, among the isomerization catalysts which may be employed are alkali metals and their $C_{3-6}$ alkoxides, sulfur, iodine, and a metal of Group VIII of the Periodic Table in the presence of hydrogen, such metal having an atomic number of 28 to 78, inclusive. As previously indicated, the two zone technique, wherein the α-pinene supply is first sweetened in one of several possible zones and then isomerized in a second zone, is particularly advantageous in prolonging the useful life of the isomerization catalyst by switching from one sweetening zone to another as the sweetening agent therein becomes exhausted without having to interrupt the isomerization process itself.

In room temperature operation with the catalysts of the present application, the equilibrium between α- and β-pinene that is approached in a practical operating period is about three percent of β-pinene; at an operating temperature of about 150° C., it is about 4 percent; and at 220° C. it is about 5.5 to 7 percent of β-pinene. As a general rule, it is preferred to sweeten the sour α-pinene at a temperature between about room temperature and a higher temperature at which substantial isomerization may first take place. Usually this temperature is about 150° C. Thereafter, the isomerization is carried out above such temperature and preferably up to about 225° C. to obtain enhanced β-pinene concentration in the isomerizate. Above this temperature, the formation of thermal isomerization and degradation products (by-products) appears to be accelerated when appreciable contact times are permitted, for example, a minute or more, between the catalyst and the pinene supply. However, substantial conversion of α- to β-pinene can be achieved, even closely approaching equilibrium, in mere tenths of a second with a very active catalyst such as elemental palladium. In such cases, it is possible to operate at a temperature as high as about 300° C. and still obtain reasonably good results by using a restricted average contact time, for example, by using a vapor phase operation. At still higher temperatures, pinene easily skeletally isomerizes and/or hydrogenates, for example, to pinane.

In a flow operation the average contact time is computed as the quotient in consistent units of the pinene capacity of the catalytic reaction zone divided by the volumetric input of pinene supply thereto per unit time corrected to average temperature and pressure conditions in the catalytic reaction zone. Successful isomerization procedures have been carried out using contact times as low as a few tenths of a second upwards to many hours. For vapor phase operation and maximum use of a given volume of catalyst, it is preferred to use contact times between about 0.1 and about one second, or longer. In liquid phase operations, a contact time of about 0.5–2 minutes for efficiency and economy is preferred. The only criticality noted with respect to the length of contact time is the desirability to avoid prolonged times (over 60 seconds) in operations at a temperature above about 225° C. for suppressing by-product formation.

A recommended recovery technique is that of fractionational distillation at a maximum temperature not above 200° C. and preferably about 125° C. to suppress thermal formation of by-products in the distillation. Other conventional processes can be used in separating α- from β-pinene in the isomerizate as disclosed in the parent patent, No. 3,278,623.

The following examples are intended only to illustrate the invention and should not be construed in any way as limiting the disclosure. One skilled in the art of terpene chemical operations will recognize how important it is to suppress formation of related isomerization products such as menthadienes (limonene chiefly), camphene, cymene, and alloocimene because they boil relatively close to β-pinene and are comparatively difficult to separate therefrom efficiently.

The α-pinene supply used in all cases was recovered from sulfate turpentine, the technical grade containing 98 percent α-pinene and about two percent camphene as an indigenous impurity. Where a purer grade of α-pinene was used, containing less than about one percent extraneous materials, the pinene supply was considered "pure" for all practical purposes. In all cases quantitative analysis of the feed and output was done by vapor phase chromatography using as a base "Carbowax 20M," the trademark for an ethylene oxide condensation product having average molecular weight of about 20,000. All temperatures are given in degrees Centigrade, and all percentages are weight percentages unless otherwise expressly indicated.

EXAMPLE 1

An amount of 2000 ml. of α-pinene obtained from sulfate turpentine was mixed with about 300 grams of an inert medium of sodium carbonate carrying a film of elemental sodium. The sodium constituted about 10 percent by weight of the inert support. The mixture was stirred at about 180 to 200° for about 30 minutes at a superatmospheric pressure of about 50 to about 300 millimeters of mercury.

Subsequently, this sodium-treated α-pinene supply was isomerized in a fractional distillation unit wherein one vessel which received the condensed distillate was charged with one percent of 0.5 percent palladium on alumina as the catalyst. The useful life of this catalyst was prolonged as compared to its life when the α-pinene was not pretreated in accordance with this example.

EXAMPLE 2

This example illustrates the use of sodium as both a pretreating and catalytic agent. A supply of α-pinene containing catalyst poisoners was volatilized and heated to about 170° C. and passed at the rate of three ml. per minute over an inert solid carrier comprising 300 grams of sodium carbonate carrying 10 grams of sodium as a film. The α-pinene was "sweetened" and simultaneously converted into the α-β-pinene equilibrium mixture with a minimum of production of such by-products as limonene and cymene. Isomerization continued until about 2,000 ml. of α-pinene had been passed over the catalyst. At this point, the β-pinene formation began to diminish, and after 2,300 ml. had been passed over the catalyst, no β-pinene was formed.

Condensation of the isomerized vapor after about 2,000 ml. of α-pinene had been passed over the catalyst analyzed as follows: 93 percent of α-pinene, 4.1 percent of β-pinene, and 2.8 percent of camphene.

If desired, it is within the contemplation of the present invention to use sequentially a series of catalysts in order to enhance the recovery of β-pinene. In this example, the sodium-treated α-pinene, having a content of 4.1 percent β-pinene, was next refluxed with a catalyst of one percent of 0.5 percent palladium on alumina in the apparatus described in Example 1. After about 45 hours of operation, the collecting kettle contained 19 percent β-pinene, 1.4 percent limonene, 3.0 percent camphene, and 0.7 percent cymene, and the balance being substantially all α-pinene.

EXAMPLE 3

A mixture was prepared containing 200 grams of an α-pinene supply and a dispersion of 35 percent of sodium particles in light naphtha having a boiling range from about 103° to 148°. The particles had an average size of about 10 microns. After a pretreatment of about 15 minutes, the admixture was then heated to 200° and maintained under sufficient pressure to preserve the liquid phase. The excess sodium present, that is, the excess over that needed to pretreat the α-pinene, caused equilibration of the α- and β-pinene from which the β-pinene was recovered. Any of the techniques previously described for this separation could be used.

Temperatures above 200° are also operable within the physical limitations of the apparatus used.

EXAMPLE 4

A two-zone procedure like that of Example 1 was carried out, except that in addition to using sodium on sodium carbonate as the sweetening agent in a pretreating zone, another charge of sodium metal was used as the catalyst in the isomerization zone. The operation took place at a temperature about 200° C. for about 4 hours. The isomerizate analyzed 4.5 percent β-pinene, three percent limonene, and the balance α-pinene.

While the foregoing describes several embodiments of the present invention, it is understood that the invention may be practiced in still other forms within the scope of the following claims.

What is claimed is:

1. A process for the substantial non-destructive isomerization of sour α-pinene to β-pinene, which comprises:
   pretreating a sour α-pinene supply at a temperature between about room temperature and a higher temperature, at which substantial isomerization may first take place, with an excess of elemental metallic sodium needed to sweeten the sour α-pinene supply,
   and then contacting the pretreated α-pinene supply with the excess of said elemental metallic sodium as a hydrogen-acceptor catalyst under neutral to basic conditions and at a temperature between about said higher temperature and about 300° C. to effect isomerization of α-pinene to β-pinene.

2. A process for the substantial non-destructive isomerization of sour α-pinene to β-pinene which comprises:
   pretreating a sour α-pinene supply in a first zone at a temperature between about room temperature and a higher temperature, at which substantial isomerization may first take place, with sufficient elemental metallic sodium to sweeten said supply, and,
   then contacting the pretreated α-pinene supply in a second zone with elemental metallic sodium as a hydrogen-acceptor catalyst under neutral to basic conditions and at a temperature between about said higher temperature and about 300° C. to effect isomerization of α-pinene to β-pinene,
   whereby the useful life of said sodium as a hydrogen-acceptor catalyst is appreciably extended and the isomerization process may continue with less frequent interruptions for exchange of isomerization catalyst for said pre-use of the elemental sodium in the first zone.

3. The process of claim 1 wherein said higher temperature at which isomerization may first take place is about 150° C.

4. The process of claim 1 wherein said elemental sodium is in a physical form having an extended surface area and is carried by a solid inert non-acidic medium, said sodium being present in an amount within the range extending from about two percent to about 30 percent by weight of the solid medium.

5. The process of claim 1 wherein said elemental sodium is in a physical form having an extended surface area and is carried by a liquid inert medium, said sodium being dispersed in the liquid medium in an amount of about 35 percent to about 50 percent by weight of the medium and is present as particles having a size less than 20 microns.

6. The process of claim 1 wherein said α-pinene supply is in the vapor phase when contacted with the elemental sodium.

7. A two-stage process for the substantially non-destructive isomerization of α-pinene to β-pinene in a volume of α-pinene supply having an initial concentration $C_1$ of β-pinene, $C_1$ being from zero to about 5 percent by weight, said process comprising:
   treating said pinene supply in a liquid phase as the first stage with elemental sodium free of acidic support having an extended surface area and at a temperature within the range of about room temperature to about 150° C. for a sufficient time to inhibit catalyst poisoning by the α-pinene supply,
   then vaporizing the pinene supply as the second stage and contacting the vaporized pinene supply with a transitory hydrogen-acceptor catalyst under neutral to basic conditions in a reaction zone maintained between about 150° C. and about 300° C., and withdrawing from said reaction zone an isomerizate having concentration $C_2$ of $\beta$-pinene, $C_2$ being greater than $C_1$.

8. The process of claim 2 wherein the elemental metallic sodium in said second zone as a hydrogen-acceptor catalyst is in a physical form having an extended surface area.

References Cited

UNITED STATES PATENTS

| | | | |
|---|---|---|---|
| 1,859,028 | 5/1932 | Cross | 208—294 |
| 2,927,074 | 3/1960 | Barger et al. | 260—674 |
| 2,951,888 | 9/1960 | Carr | 260—683.65 |
| 3,096,382 | 7/1963 | Wright et al. | 260—674 |
| 3,312,750 | 4/1967 | Berg et al. | 260—675.5 |

DELBERT E. GANTZ, *Primary Examiner.*

G. E. SCHMITKONS, *Assistant Examiner.*